(12) United States Patent
Carpenter et al.

(10) Patent No.: US 9,088,605 B2
(45) Date of Patent: Jul. 21, 2015

(54) PROACTIVE NETWORK ATTACK DEMAND MANAGEMENT

(75) Inventors: Robert Carpenter, Folsom, CA (US); Hong Li, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 2415 days.

(21) Appl. No.: 11/857,709

(22) Filed: Sep. 19, 2007

(65) Prior Publication Data

US 2009/0077632 A1 Mar. 19, 2009

(51) Int. Cl.
*G08B 23/00* (2006.01)
*H04L 29/06* (2006.01)

(52) U.S. Cl.
CPC ....... *H04L 63/1441* (2013.01); *H04L 2463/141* (2013.01)

(58) Field of Classification Search
CPC ............. H04L 12/4675; H04L 2463/141; H04L 63/1441; G06F 21/00
USPC .................................................. 726/15, 22
See application file for complete search history.

(56) References Cited

U.S. PATENT DOCUMENTS

| | | | |
|---|---|---|---|
| 7,080,378 B1 * | 7/2006 | Noland et al. ................. | 718/104 |
| 7,757,283 B2 * | 7/2010 | Robert et al. .................... | 726/22 |
| 7,774,849 B2 * | 8/2010 | Russell et al. ................... | 726/25 |
| 8,855,143 B1 * | 10/2014 | Acampora ..................... | 370/477 |
| 2004/0054925 A1 * | 3/2004 | Etheridge et al. ............. | 713/201 |
| 2005/0044197 A1 * | 2/2005 | Lai ................................ | 709/223 |
| 2005/0111367 A1 * | 5/2005 | Jonathan Chao et al. ..... | 370/235 |
| 2007/0192862 A1 * | 8/2007 | Vermeulen et al. ............. | 726/23 |
| 2008/0008095 A1 * | 1/2008 | Gilfix ............................ | 370/235 |
| 2008/0104608 A1 * | 5/2008 | Hyser et al. ................... | 718/105 |
| 2010/0011434 A1 * | 1/2010 | Kay ............................... | 726/14 |

OTHER PUBLICATIONS

Abawajy, An Approach to Support a Single Service Provider Address Image for Wide Area Networks Environment, IEEE, 2000, pp. 59-63.*
Chong et al, Automated Physical Storage Provision Using a Peer-to-Peer Distributed File System, IEEE, 2005, pp. 1-7*

* cited by examiner

*Primary Examiner* — Luu Pham
*Assistant Examiner* — Jenise Jackson
(74) *Attorney, Agent, or Firm* — Schwegman Lundberg & Woessner, P.A.

(57) ABSTRACT

Various embodiments described and illustrated herein provide one or more of systems, methods, software, and firmware to handle attack generated demand proactively using distributed virtualization. One goal of some such embodiments is to provide a time window of stable operational response within which an intrusion detection system may detect an attack and/or cause a countermeasure against the attacks to be activated. Demand excursions which are not caused by an attack are supported during the variability of demand providing transparent response to legitimate users of the system. These embodiments, and others, are described in greater detail below.

20 Claims, 4 Drawing Sheets

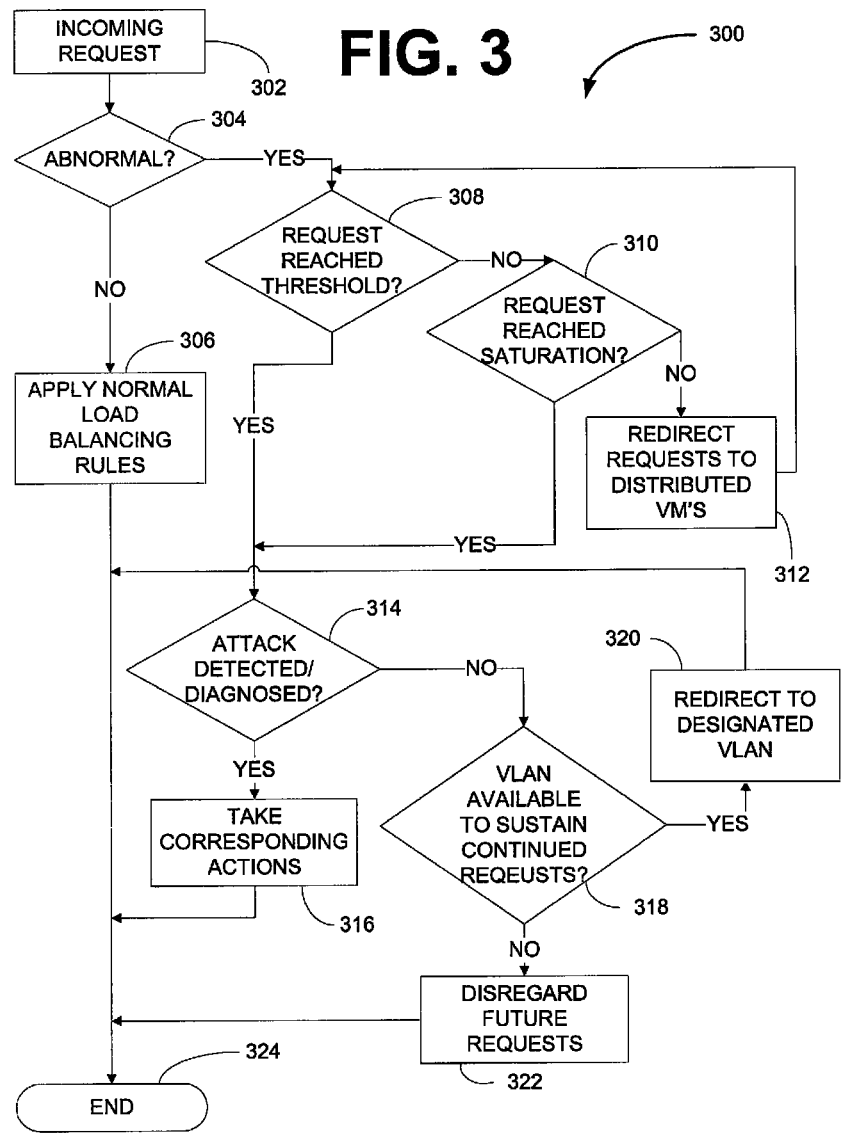

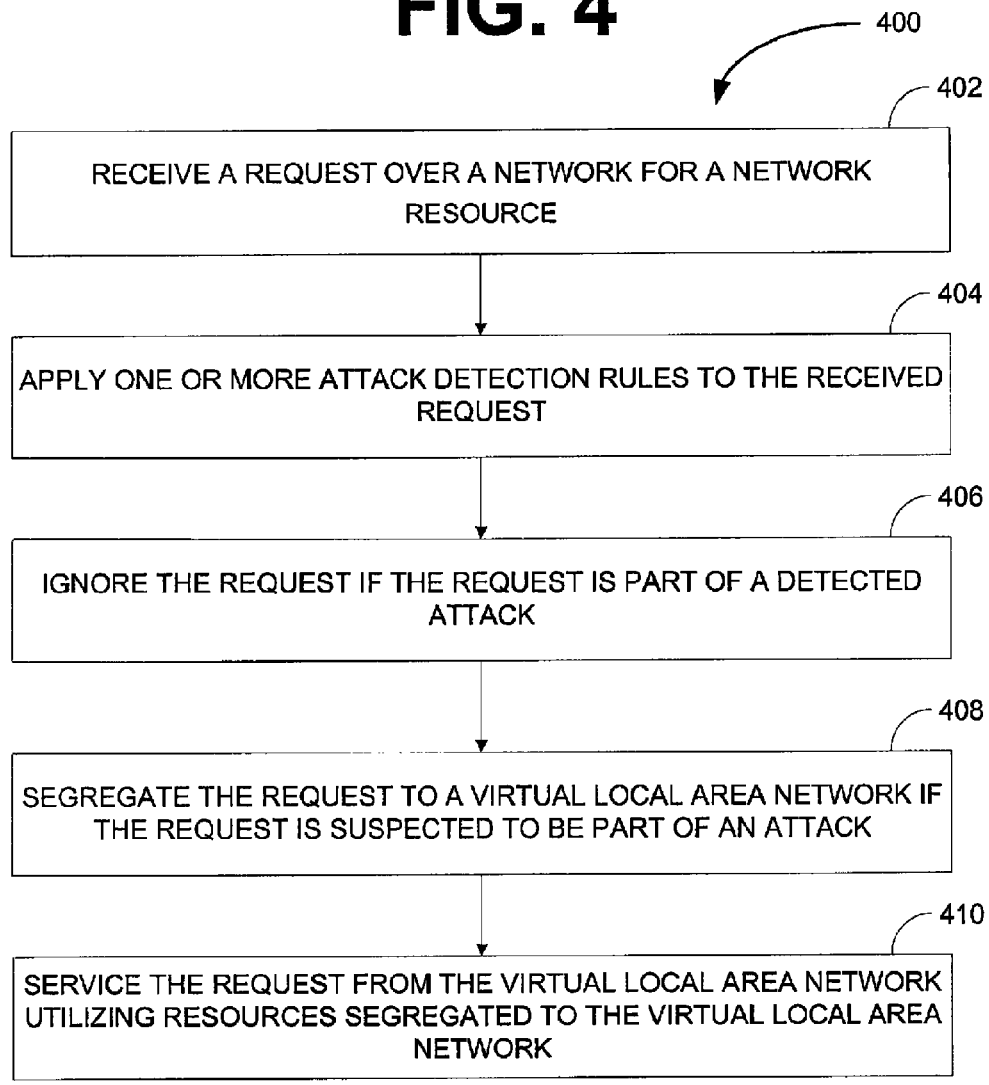

PROACTIVE NETWORK ATTACK DEMAND MANAGEMENT

BACKGROUND INFORMATION

A distributed denial of service attack ("DDoS") occurs when multiple compromised systems flood the bandwidth or resources of a targeted system, usually a web server. For example, one type of DDoS mechanism is triggered on a specific date and time. At that specific date and time, thousands of compromised machines on the internet will access a target web server at the same time, which brings the web server down due to resource exhaustion. There are several defense mechanisms being used or researched today. These mechanisms include ingress filtering to stop the attack at the target, trace back to catch and stop the attacker at the source, and resource management and congestion control. All these defense techniques face increasing challenges as attack detection and trace back become more and more difficult.

BRIEF DESCRIPTION OF THE DRAWINGS

FIG. 3 is a flow diagram of a method according to an example embodiment.

FIG. 4 is a block flow diagram of method according to an example embodiment.

DETAILED DESCRIPTION

Various embodiments described and illustrated herein provide one or more of systems, methods, software, and firmware to handle attack generated demand proactively using distributed virtualization. One goal of some such embodiments is to provide a time window of stable operational response within which an intrusion detection system may detect an attack and/or cause a countermeasure against the attacks to be activated. Demand excursions which are not caused by an attack are supported during the variability of demand providing transparent response to legitimate users of the system. These embodiments, and others, are described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
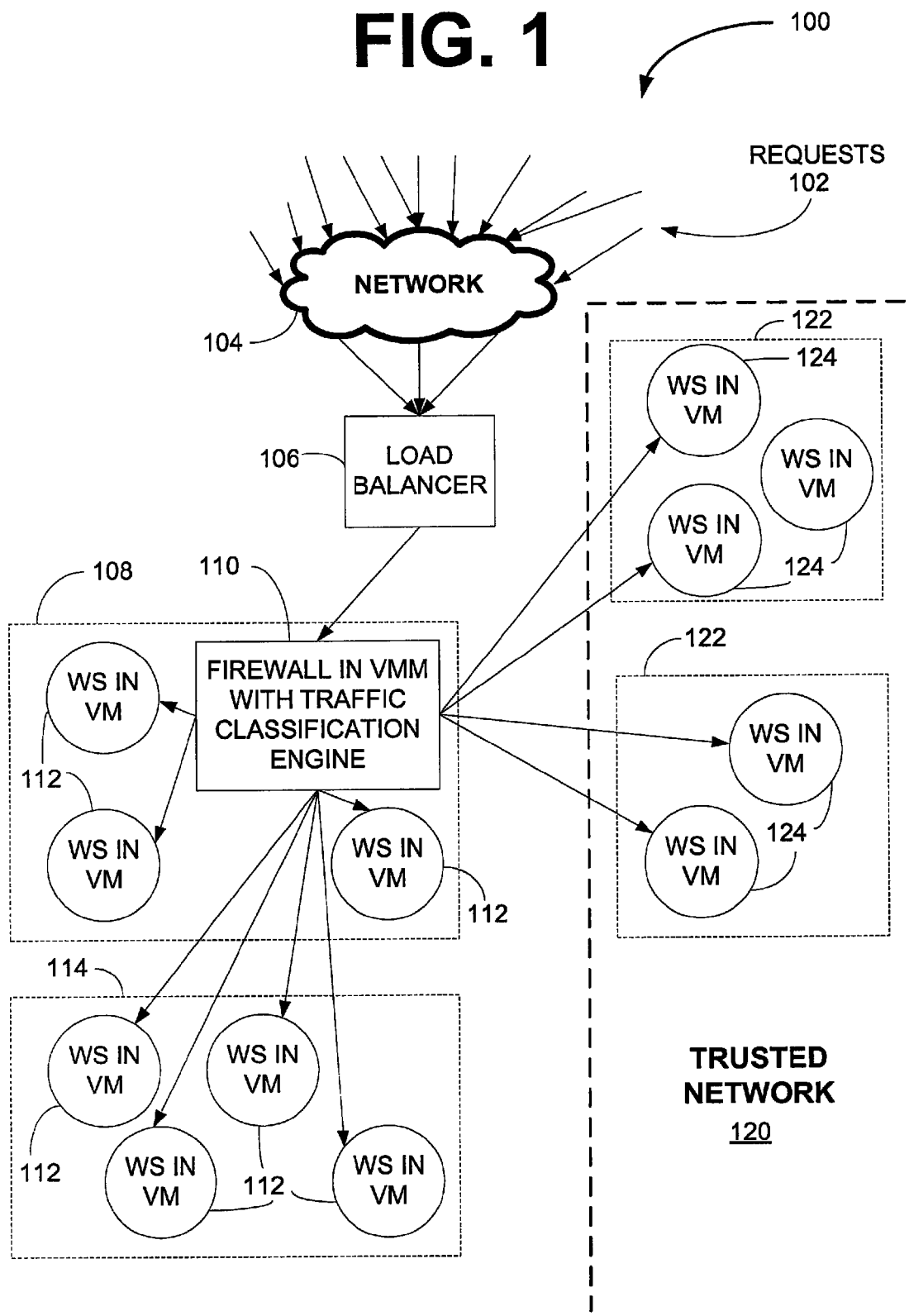
FIG. 1 is a logical block diagram of a system according to an example embodiment.

FIG. 1 is a logical block diagram of a system 100 according to an example embodiment. The system 100 is an environment within which an acceptable level of service may be sustained in the face of a potential attack, such as a DDoS, and the potential attack may be contained with minimum impact to legitimate service. As a result, a managed window of time within which a potential, or suspected, attack may be evaluated to determine if an attack is actually taking place. This window of time enables detection algorithms to examine a larger and more optimal set of data, such as from increased demand, which decreases the likelihood of false positives and consequent over reaction.

The system 100 includes a requests 102 being received over a network 104, such as the Internet. The requests 102 are funneled over the network 104 to a first network device or appliance of an organization, such as a load balancer 106. This device forwards received requests to a firewall 110.

The firewall 110 in some embodiments, is a standalone network appliance-type device. The firewall 110 may be part of load balancer 106, instantiated within a virtual machine or virtual machine monitor operating on a server 108, or a process on another computing device. The firewall 110 as included in the example system 100 is instantiated as a virtual machine monitor on a server 108 which may also include one or more web servers 112 instantiated within virtual machines.

The firewall 110 includes a traffic classification engine. In some embodiments, the traffic classification engine performs preliminary filtering on all incoming traffic based on usage rules. Some usage rules may specify that request from a particular IP address or other source identifier are trusted requests. Other usage rules may specify a thermometer threshold for identical or similar requests over a period. If such as thermometer threshold is reached or exceeded, such requests may be classified by the traffic classification engine as suspect requests that may be part of an attack, such as a DDoS. In some such embodiments, if higher than normal requests are detected, for example, the same type of web access requests are arriving approximately at the same time, the traffic classification engine, as instructed by a usage rule may distribute the abnormal requests to distributed virtual machines 124 that may be instantiated on one or more servers 122 across a trusted network 120. The trusted network 120 may be, in various embodiments, a virtual machine overlay, a local area network subnet, a virtual local area network, or other similar network type. Other requests not classified as part of a suspected attack may be serviced normally, such as by web servers 112 of one or more virtual machines of the server 108, another server 114, or other web servers available over a network.

In some embodiments, to service suspected attack requests, one or more web servers 124 may be instantiated on demand on one or more servers of the trusted network 120. As demand for resources of a suspected attack increase, more web servers 124 may be instantiated on demand until the attack is verified as an attack by detection algorithms, such as attack analytic processes or other processes.

As demand of suspected attacks increases, a saturation point may be reached where the resources of the trusted network 120 may not keep up with the demand. In such instances, the traffic classification engine may take one or more actions. These actions may include one or more of silently disregarding suspect requests, deflecting abnormal, suspect traffic to a virtual local area network to help detection, or continue to distribute traffic load to virtual machines that may be instantiated in other locations if resources are available.

If an attack is verified as an attack, the traffic classification engine may just ignore subsequently received requests. If a suspect attack is determined not to be an attack, subsequent requests may be handled by normal load balancing techniques and the web servers instantiated to handle the suspect attacks may be destroyed to free up servers 122 to handle other or future suspect attacks.

The system 100 provides many advantages. Some such advantages include avoidance of "hard" problems such as ingress filtering at network firewalls and tracing back to attackers while allowing adaptive load distribution based on diagnostics in the traffic classification engine and other processes that may receive traffic data from the traffic classification to perform analytics on the traffic data to determine if suspect requests are in fact, or assumed to be, an actual attack, such as a DDoS. Such embodiments also provide increased abilities to sustain system 100 operability in the face of an attack to buy critical time for attack detection and countermeasure identification through distributed virtualization across a trusted network. This may allow dynamic utilization of unused or underused resources. Further, through maintaining system 100 operability in the face of an attack, more time is available to minimize false positives in traffic classification to maintain user experience throughout a window of a temporal attack. Some embodiments further are able to ensure quality of service, such as to meet service level agreements/objectives in the face of an attack, which typically may not be achieved with simple network traffic load balancing approaches. Additional, through use of virtual machines and virtual local area networks, suspect requests may be segregated to help ensure system 100 security and enable workload distribution.

Figure 2:
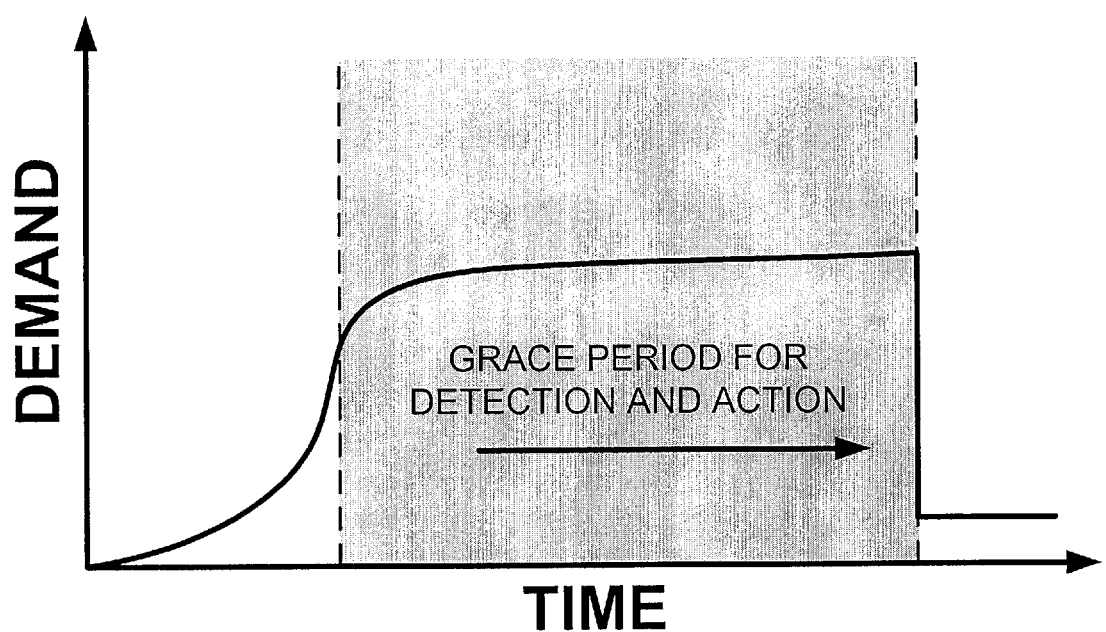
FIG. 2 is a time-demand graph depicting a grace period for detection of a network attack.

FIG. 2 is a time-demand graph depicting a grace period for detection of a network attack. As mentioned above, various embodiments, when faced with a potential attack, provide a grace period within which potential attacks may be evaluated while operability is maintained. For example as the traffic classification engine as described above, evaluates requests, suspect requests are processed separately, such as through the use of web servers on virtual machines over a trusted network. The trusted network and virtual machines are segregated from other system resources so as not to affect system performance in servicing non-suspect requests.

As demand for a resource increases over time, a threshold may be reached. For example, 500 requests for a seldom requested resource may be received within one minute. Such requests may be classified by the traffic classification engine as suspect requests of a potential attack. The traffic classification engine may then instantiate one or more web servers, depending on the level of demand of an available resource, on one or more virtual machines over a virtual local area network. This grey portion of FIG. 2 has now been entered. This may be thought of as a grace period where the suspect requests will be handled as best as possible in view of the available resources. If necessary, and resources are available, the traffic classification engine may cause more web servers to be instantiated on the virtual machines.

During the grace period, the traffic classification engine may continue to feed demand data to one or more analytical processes which operate on the data to identify whether or not the suspect requests are part of an attack. The grace period allows demand to be met, at least as best as system resources allow, while the analytical processes execute. During this grace period, the suspect requests are segregated from other portions of the system. Thus, non-suspect requests are serviced in a normal fashion. Processing of the segregated, suspect requests does not affect the processing of non-suspect requests.

The grace period ends when the one or more analytic processes resolve the demand data to identify the requests as part of an attack or normal increased demand. FIG. 2 illustrates a scenario where the suspect requests are part of an attack. In such a scenario, the analytic processes may communicate the identification of an attack to the traffic classification engine at which time future requests determined to be part of the attack may simply be quietly ignored. Thus, at the end of the grace period, demand falls off drastically.

FIG. 3 is a flow diagram of a method 300 according to an example embodiment. The method 300 is a method which may be performed by a traffic classification engine.

Consider when a DDoS attack is launched to a certain universal resource locator ("URL"), the first perception by the web server is a sudden increase in application requests, which is abnormal but at that moment the nature of the increase is unknown. It may be just legitimate traffic or it may be an attack. The approach of the method 300 is to utilize an edge piece of a web servicing environment, such as a traffic classification engine in a firewall, contain bandwidth usage within a virtual machine or virtualized network, provide a control point for the analysis, and support business service quality of service during detection, analysis, and response. The approach also defines and isolates the locus for remedial action if required. More detail of such an embodiment is illustrated in the method 300.

The method 300 includes receiving incoming requests 302 and determining 304 if the requests are abnormal. If the requests are not abnormal, the method 300 includes applying normal load balancing rules 306 and the method ends 324. However, if it is determined 304 that a request is abnormal, a further determination is made to determine 308 if a request threshold has been reached, such as a number of requests for a specific URL over a certain period.

If the threshold has been reached, a determination 314 is made if an attack has been previously detected or diagnosed that is applicable to the current request. If yes, corresponding actions as specified by an analytic process are taken 316 and the method 300 ends 324.

If an attack has not been detected or diagnosed, another determination is made as to whether a segregated network, such as a virtual local area network, is available to sustain processing of continued requests for the resource 318. If not, future requests for the resource are disregarded 322 and the method 300 ends 324. If a segregated network and resources thereon are available to service the current abnormal request, the request is redirected to the segregated network and resources and the method 300 ends 324.

Returning back to the determination 308 if a request threshold has not been reached, a determination 310 is made as to whether request saturation for the abnormal request has been reached. For example, if the number of requests exceed the processing capabilities available, that is the request has not reached saturation, such as on a local virtual machine, the request may be redirected 312 to a distributed virtual machine web server, such as within an underutilized server. That server may then determine 308 if a request threshold has been reached. The method 300 continues in an identical fashion from that point until the request is either serviced, disregarded, or otherwise times out.

FIG. 4 is a block flow diagram of method 400 according to an example embodiment. The example method 400 includes receiving a request over a network for a network resource 402 and applying one or more attack detection rules to the received request 404. The method 400 further includes ignoring the request if the request is part of a detected attack 406 or segregating the request to a virtual local area network if the request is suspected to be part of an attack 408. The method 400 then services the request from the virtual local area network utilizing resources segregated to the virtual local area network 410.

In some embodiments of the method 400, the resources segregated to the virtual local area network 408 include one or more virtual machines instantiated on demand as needed to service requests suspected to be a part of one or more identified potential attacks. Each of the one or more virtual machines may include a server process operating within the virtual machine to service requests.

In some embodiments, an attack detection rule may include a threshold level, which when reached, causes requests to be classified as part of a specific suspected attack and an action rule, the application of which specifies how to handle requests classified as part of the specific suspected attack. In some embodiments, if a number of requests for a particular network resource reaches a saturation point, subsequent requests for the particular network resource are ignored. The saturation point may be a number of requests the virtual local area network is able to service over a particular period.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

These embodiments, and others, may be implemented in virtually any networked environment including servers that serve content to requesters. One such networked environment may include a web server farm environment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving a request over a network for a network resource;
applying one or more attack detection rules to the received request, the one or more attack rules including an action rule that specifies how to handle the request when classified as part of a suspected attack;
determining whether the request is part of a detected attack or suspected to be part of an attack;
ignoring the request in response to determining that the request is part of a detected attack;
segregating the request to a virtual local area network in response to determining that the request is suspected to be part of an attack in accordance with the action rule; and
servicing the request from the virtual local area network utilizing resources segregated to the virtual local area network.

2. The method of claim 1, wherein the network is the Internet.

3. The method of claim 1, wherein the resources segregated to the virtual local area network include:
one or more virtual machines instantiated on demand as needed to service requests suspected to be a part of one or more identified potential attacks.

4. The method of claim 3, wherein each of the one or more virtual machines includes a server process operating within the virtual machine to service requests.

5. The method of claim 1, wherein one attack detection rule includes:
a threshold level, which when reached, causes requests to be classified as part of a specific suspected attack.

6. The method of claim 1, wherein if a number of requests for a particular network resource reaches a saturation point, subsequent requests for the particular network resource are ignored.

7. The method of claim 6, wherein the saturation point is a number of requests the virtual local area network is able to service over a particular period.

8. A system comprising:
partitionable hardware processor resources;
a first network interface configured to connect to a first network;
a second network interface configured to connect to a second network;
a classification engine executable on one or more of the partitionable hardware processor resources to cause the one or more of the partitionable resources to:
receive network resource requests over the first network interface for resources accessible via the second network interface;
apply one or more attack detection rules to each received resource request to classify each resource request as an attack request, a suspected attack request, or a normal request; upon first detection of a suspected attack resource request, instantiate a virtual network over the second network interface, the virtual network including one or more virtual machines instantiated on the second network, the virtual machines including processes operative to service the suspect attack resource request; and
sequester the suspect attack resource request and subsequently identified suspect attack resource requests to the virtual network.

9. The system of claim 8, wherein the first and second network interfaces are a single network interface configured to connect to a network capable of carrying network traffic of two or more networks.

10. The system of claim 8, wherein the classification engine is further configured to:
instantiate further virtual machines as needed to fulfill suspected attack requests.

11. The system of claim 8, wherein the classification engine is further configured to:
send data to a suspected attack analytic processes;
receive data from the suspected attack analytic processes that suspected attack requests are either actually an attack or not an attack.

12. The system of claim 11, wherein if data received from the suspected attack analytic processes indicate that a suspected attack is an attack, the classification engine ignores subsequent requests classified as part of the attack.

13. The system of claim 11, wherein if data received from the suspected attack analytic processes indicate that a suspected attack is not an attack, the classification causes subsequently received requests to be serviced without sequestering.

14. The system of claim 8, wherein the classification engine counts resource requests over a period and classifies requests for multiple resources available over the second network interface.

15. The system of claim 14, wherein the classification engine identifies suspect attacks when requests for a particular resource reach or exceed a threshold amount over the period.

16. A non-transitory machine readable medium including instructions that, when executed by a machine, cause the machine to perform operations comprising:
receiving a request over a network for a network resource;
applying one or more attack detection rules to the received request, the one or more attack rules including an action rule that specifies how to handle the request when classified as part of a suspected attack;
determining whether the request is part of a detected attack or suspected to be part of an attack;
ignoring the request in response to determining that the request is part of a detected attack;
segregating the request to a virtual local area network in response to determining that the request is suspected to be part of an attack in accordance with the action rule; and
servicing the request from the virtual local area network utilizing resources segregated to the virtual local area network.

17. The machine readable medium of claim 1, wherein the resources segregated to the virtual local area network include:
one or more virtual machines instantiated on demand as needed to service requests suspected to be a part of one or more identified potential attacks.

18. The machine readable medium of claim 1, wherein one attack detection rule includes:
a threshold level, which when reached, causes requests to be classified as part of a specific suspected attack.

19. The machine readable medium of claim 1, wherein if a number of requests for a particular network resource reaches a saturation point, subsequent requests for the particular network resource are ignored.

20. The machine readable medium of claim 19, wherein the saturation point is a number of requests the virtual local area network is able to service over a particular period.

* * * * *